(12) United States Patent
Lane

(10) Patent No.: US 6,838,119 B2
(45) Date of Patent: Jan. 4, 2005

(54) MANUFACTURING METHOD TO IMPROVE OXYGEN ION CONDUCTIVITY OF AN IONIC CONDUCTOR

(75) Inventor: Jonathan Andrew Lane, Snyder, NY (US)

(73) Assignee: Praxair Technology, Inc., Danbury, CT (US)

(*) Notice: Subject to any disclaimer, the term of this patent is extended or adjusted under 35 U.S.C. 154(b) by 195 days.

(21) Appl. No.: 10/329,440

(22) Filed: Dec. 27, 2002

(65) Prior Publication Data

US 2004/0126488 A1 Jul. 1, 2004

(51) Int. Cl.[7] .................................................. B05D 3/02
(52) U.S. Cl. .................. 427/226; 427/376.1; 427/376.2
(58) Field of Search .............................. 427/226, 376.1, 427/376.2

(56) References Cited

U.S. PATENT DOCUMENTS 4,861,345 A * 8/1989 Bowker et al. ............ 29/623.1
2001/0007381 A1 * 7/2001 Kleinlogel et al. ......... 264/660

OTHER PUBLICATIONS

Myeon et al., "Properties of $La_{0.6}Sr_{0.4}Co_{0.2}Fe_{0.8}O_{3-\delta}$ (LSCF) Double Layer Cathodes On Gadolinium–Doped Cerium Oxide (CGO) Electrolytes I. Role of $SiO_2$", Solid State Ionics 106 (1998) pp 247–253.

Ralph et al., "Improving Gd–Doped Ceria Electrolytes For Low Temperature Solid Oxide Fuel Cells", Materials Research Society (2000) pp 309–314.

Steele, "Appraisal of $Ce_{1-y}Gd_yO_{2-y/2}$ Electrolytes for IT–SOFC Operation At 500° C.", Solid State Ionics 129 (2000) pp 95–110.

Ralph, "Grain Boundary Conductivity Enhancement in Ceria–Gadolinia Solid Solutions", Electrochemical Proceedings vol. 97–18, pp 1021–1030.

* cited by examiner

Primary Examiner—Elena Tsoy
(74) Attorney, Agent, or Firm—David M. Rosenblum

(57) ABSTRACT

A method of manufacturing an ionic conductor to improve oxygen ion conductivity that is otherwise reduced by the presence of deleterious impurities comprising silicon or silicon containing compounds. In accordance with the invention a dissolved salt of a dopant consisting of an alkaline-earth metal is applied to an oxygen ion conducting material composed of doped ceria, doped zirconia, or doped lanthanum gallate and having the impurities. The solution can also be applied with equal success to cation salts and oxides used in making the oxygen ion conducting material. The oxygen ion conducting material with the solution applied thereto is thoroughly mixed and then heated to evaporate the solvent and to decompose the alkaline-earth salt and thereby to form said ionic conductor.

14 Claims, 3 Drawing Sheets

MANUFACTURING METHOD TO IMPROVE OXYGEN ION CONDUCTIVITY OF AN IONIC CONDUCTOR

FIELD OF THE INVENTION

The present invention relates to a method of manufacturing an ionic conductor to improve oxygen ion conductivity that would otherwise be reduced by the presence of impurities comprising silicon. More particularly, the present invention relates to such a method in which a solution containing a dissolved salt of an alkaline-earth metal is applied to doped ceria, doped zirconia, doped lanthanum gallate or a stoichiometric mixture of precursor salts or oxides thereof and then decomposed to produce the ionic conductor.

BACKGROUND OF THE INVENTION

Ionic conductors are formed of ceramic materials that are capable of conducting oxygen ions at elevated temperature and that have a low electronic conductivity. They are used to form electrolytes that are typically used within oxygen generators and solid oxide fuel cells. Such electrolytes are employed in a layered structure that has an anode and a cathode sandwiching the electrolyte. There are other uses for such materials known in the art such as steam electrolyzers and the like.

In case of an oxygen generator, when an electrical potential is applied across the anode and cathode, oxygen, in an oxygen containing feed, ionizes to produce oxygen ions which are transported through the electrolyte. The oxygen ions emerge from the electrolyte and recombine to form molecular oxygen. In a solid oxide fuel cell, the anode and cathode are connected to an electric load. A fuel is combusted using the permeated oxygen as an oxidizer. The electrons released as a result of the oxygen ions exiting the electrolyte at the anode travel to the electric load and then to the cathode to ionize the oxygen in the oxygen containing feed.

Oxygen generators, solid oxide fuel cells and like devices use elements having layered anode-electrolyte-cathode structures in the form of flat plates or tubes that are fabricated by known techniques such as isostatic pressing and tape casting. In such methods oxygen ion conducting materials such as doped zirconia or gadolinium doped ceria in the form of a powder are mixed with an organic binder and then molded into the desired shape or onto the anode layer. The anode layer can be a conductive metal such as silver supported by an inert structure or a mixed conductor capable of conducting both oxygen ions and electrons. The resultant green form is fired to burn out the binder and to sinter the materials into a coherent mass. Thereafter, the cathode layer is applied.

As may be appreciated, to be useful in a practical device, such as an oxygen generator or a solid oxide fuel cell, it is important that the oxygen ion conductivity be the maximum obtainable for a particular material as well as its sintered density and therefore the strength thereof. As mentioned in 106 Solid State Ionics, "Properties of $La_{0.6}Sr_{0.4}Co_{0.2}Fe_{0.8}O_{3-\delta}$ (LSCF) Double Layer Cathodes on Gadolinium-Doped Cerium Oxide (CGO) Electrolytes I. Role of $SiO_2$", by Bae et al., pp. 247–253 (1998), silicon in the form of silicon oxides has a ubiquitous presence in all oxides. Such silicon can negatively influence the conductivity of an electrolyte formed of gadolinium-doped cerium oxide (hereinafter "CGO").

The need to increase the conductivity of CGO electrolytes, particularly at low temperatures, has been identified in the prior art with respect to solid oxide fuel cells. CGO, while having a high conductivity, is not robust in high temperature reducing atmospheres present in solid oxide fuel cells. Hence, it is necessary to use the CGO for such applications at relatively low temperatures of operation in the neighborhood of 500° C. to 700° C. Moreover, the cost of the solid oxide fuel cell is also reduced by operating it at a lower temperature because less temperature critical components are required. However, at such temperatures, the oxygen ion conductivity becomes particularly critical for CGO. Hence, there exists the need in such applications and operations to maximize the conductivity of CGO.

In 575 Material Research Society Symposium Proceedings, "Improving Gd-Doped Ceria Electrolytes for Low Temperture Solid Oxide Fuel Cells", by Ralph et al., pp. 309–314 (2000), the conductivity of CGO having impurities such as silicon dioxide is improved by doping the CGO with calcium. It is suggested in this reference that praseodymium and iron dopants would have the same effect. The calcium-doped CGO having impurities is made by using an amorphous citrate route of preparation. Such preparation is an atomic mixing technique that involves mixing cation salts in proper stoichiometric ratios with citric acid and then dissolving the resultant mixture in water to produce an aqueous solution. The solution is then heated and calcined to form the oxide.

In Ralph et al., it is mentioned that grain boundary conductivities showed an improvement over the standard CGO samples due to formation of a second phase of reasonably good conductivity as compared with the poor conductivity of the impurity oxides such as $SiO_2$. In Ralph et al. the $SiO_2$ concentration is stated to be less than 20 parts per million.

In 129 Solid State Ionics, "Appraisal of $Ce_{1-y}Gd_yO_{2-y/2}$ Electrolytes for IT-SOFC Operation at 500° C.", by Steele, pp. 95–110 (2000), it is noted that the use of highly purified powders for CGO and doped zirconia electrolytes, that is an $SiO_2$ content of less than 50 parts per million in order to obtain sufficient conductivity of the electrolyte material at low temperatures of operation.

It therefore can be understood from the foregoing references that contaminants such as silicon in the form of silicon oxides act to lower ionic conductivity in CGO and doped zirconia electrolyte materials. In order to operate an SOFC employing an electrolyte formed of CGO and other materials at low temperature, it is necessary that the ionic conducting material making up the electrolyte should be as pure as possible, that is contain a minimum amount of silicon. Furthermore, such pure forms of CGO can be doped to provide a further increase in low temperature conductivity with the use of calcium dopants. As may be appreciated, the same criteria for the use of CGO and YSZ in solid oxide fuel cells applies equally to other similar devices such as oxygen generators.

In US 2001/0007381 A1, a salt solution containing a transition metal dopant, for instance, iron dissolved in a solution, is applied to purified CGO powder in an amount of about 2 mol %. This treatment reduces the sintering temperature so that a sintered ceramic element with small grain size can be produced having superior strength to untreated CGO.

It is to be also noted that the purer the electrolyte powder, the higher the costs involved in obtaining the electrolyte. For instance, a powder 99 percent pure costs about 75 percent as much as a powder 99.9 percent pure which in turn costs about 60 percent as much as a powder 99.99 percent pure. Hence, while there exists the general need to raise the oxygen ion conductivity of ion conductors having grain boundary impurities such as silicon or silicon containing compounds, such need is particular acute with particularly low purity oxygen ion conducting materials. If such materials can be made useful by enhancing their ion conductivity, they are particularly advantageous due to their low cost.

As will be discussed, the present invention provides a method of manufacturing ionic conductor materials that are doped with alkaline-earth metals that enhances the oxygen ion conductivity over that obtainable by prior art manufacturing techniques. In this regard, as will be discussed, such prior art techniques, such as disclosed in the Ralph et al. article are not effective in enhancing the conductivity of low purity ionic conductors such as CGO. Furthermore, an added benefit of the present invention is that the strength of the ionic conducting material is also enhanced.

SUMMARY OF THE INVENTION

The present invention provides a method of manufacturing an ionic conductor to improve oxygen ion conductivity that is otherwise reduced by the presence of deleterious impurities comprising silicon. In accordance with the invention a salt of a dopant is dissolved into a solvent to form a solution. The dopant consists of an alkaline-earth metal. The solution is applied to an oxygen ion conducting material composed of doped ceria, doped zirconia, or doped lanthanum gallate and having the deleterious impurities. The oxygen ion conducting material is a powder having particles of less than about 100 microns in size. The solution is applied such that a molar ratio of the dopant to total cations within said ionic conductor is between about 0.001 and about 0.1. Further, the solution is mixed with the particles so that the solution uniformly covers the particles. The oxygen ion conducting material is heated with the solution applied thereto to evaporate the solvent and to decompose the salt and thereby to form said ionic conductor.

In another aspect of the present invention, the solution containing the alkaline-earth metal is applied to a mixture of precursor salts that are substantially insoluble in the solvent or oxides of the constituent cations of an oxygen ion conducting material. The oxygen ion conducting material is composed of doped ceria, doped zirconia, or doped lanthanum gallate and has a silicon content of at least 50 parts per million. The precursor salts or oxides are a powder having particles of less than about 100 microns in size. After application and mixing, the precursor salts or oxides are heated with the solution applied thereto to evaporate the solvent and to decompose the salts or oxides and thereby to form said ionic conductor.

As mentioned above, the low conductivity exhibited by certain batches of ionic conductors is the result of surface impurities at the grain boundaries. A known impurity that has deleterious effects on conductivity is silicon dioxide. In the prior art, calcium doped CGO with a low silicon content increases the conductivity of the CGO. As will be shown hereinafter, the method of the present invention produces such doped materials with a conductivity that is further enhanced over that obtainable by such prior art atomic mixing techniques as amorphous citrate preparation. In fact, such doping has no or little effect in case of materials with high amounts of silicon impurities, such as above 50 parts per million, while unexpectedly, the present invention can produce a measurable ion conductivity enhancement for such materials.

Without wishing to be held to any specific theory of operation, it is believed by the inventor herein that the addition of the calcium or other alkaline-earth metal by way of a solution applied to the surface of the particles, as opposed to the prior art atomic mixing, acts to further drive the calcium or other alkaline-earth metal towards the grain boundary and hence, to the surface to provide more of such material to interact with impurities. As will be discussed, the method of manufacturing employed in the present invention also enhances the strength of the conductor.

The oxygen ion conducting material can be doped cerium dioxide having an average composition given by the chemical formula $Ce_{1-x}M_xO_{2-d}$. In this formula, M is Sm, Gd, Y, La, Pr, Sc or mixtures thereof, x is between about 0.03 and 0.5, and the value of d is such that the composition is rendered charge neutral. The molar ratio of the alkaline-earth metal can be between about 0.001 and about 0.05. More preferably, such molar ratio lies between about 0.005 and about 0.025. Preferably, x is between about 0.08 and about 0.25.

The dopant can preferably be calcium and said oxygen ion conducting material can be the doped cerium dioxide discussed above. Preferably, x can be 0.1 and the molar radio can be 0.01.

The solution can have about 0.05 molar concentration.

Where the solution is added to the oxygen ion conducting material, advantageously, the oxygen ion conducting material with solution applied can be formed into a desired configuration before heating the same and then heating said oxygen ion conducting material under conditions sufficient to sinter the ionic conductor. Similarly, in case the solution is added to a mixture of salts or oxides of cations, the mixture with said solution applied can be formed into a desired configuration before heating the same and then heating said mixture with said solution applied under conditions sufficient to sinter the ionic conductor.

As may be appreciated, such configurations can be a layer applied to an anode or an anode supported by an inert material in the form of a plate or tube. Thus, the ionic conductor and electrolyte layer are formed in one step as opposed to prior art techniques in which the ionic conductor is formed into the desired finished configuration.

The dopant is preferably calcium or strontium.

BRIEF DESCRIPTION OF THE DRAWINGS

While the specification concludes with claims distinctly pointing out the subject matter that Applicant regards as his invention, it is believed that the invention will be better understood when taken in connection with the accompanying drawings in which:

DETAILED DESCRIPTION

Figure 1:
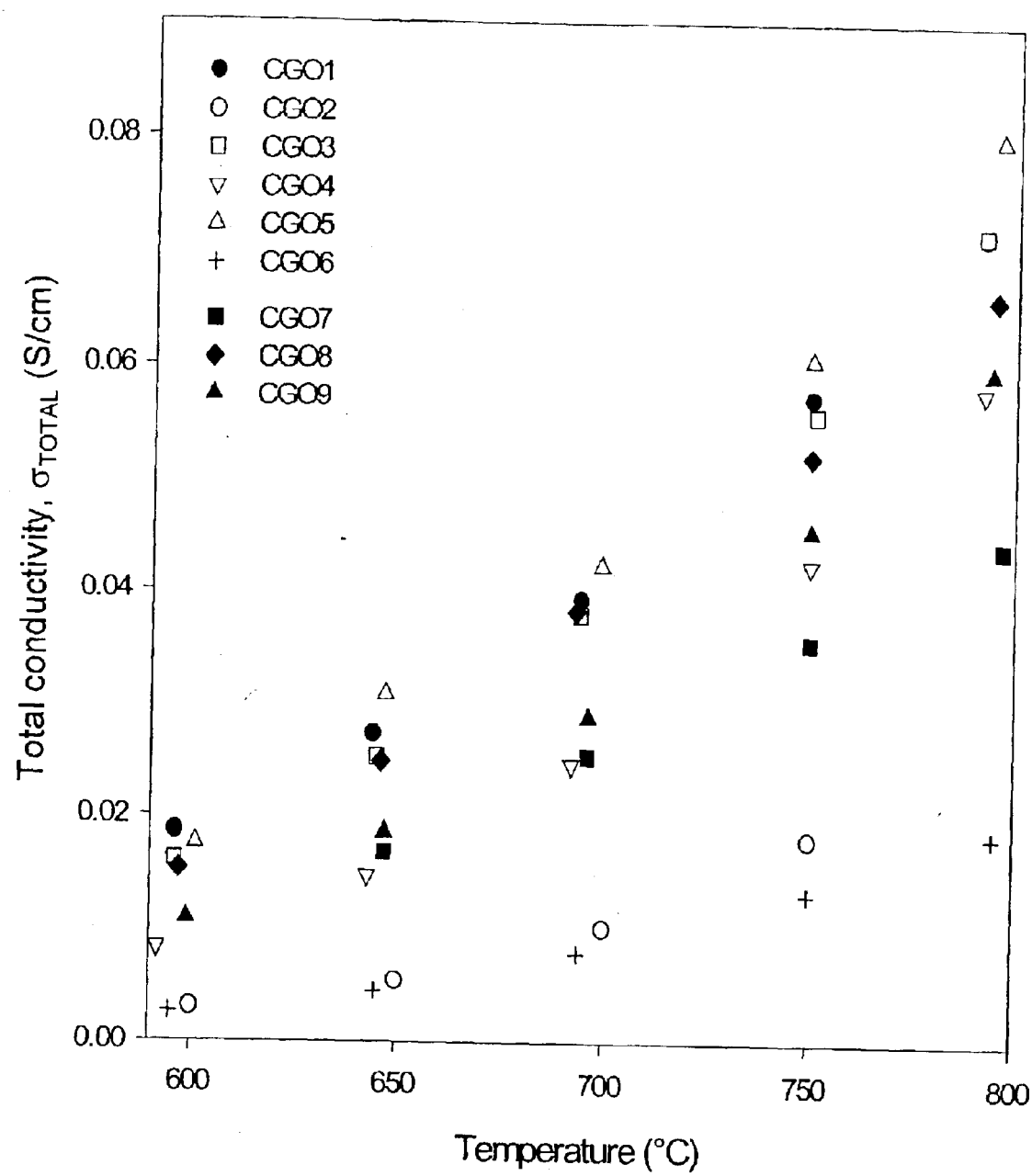
FIG. 1 is a graph of conductivity versus temperature of doped oxide ionic conductors manufactured in accordance with an embodiment of the present invention compared with those of the prior art.

As will be discussed, the present invention has application to improvement of conductivity and strength of oxygen ion conducting materials such as doped ceria ($Ce_{1-x}M_xO_{2-z}$), doped zirconia ($Zr_{1-x}M_xO_{2-z}$), and doped lanthanum gallate ($La_{1-x}A_xGa_{1-y}B_yO_{3-z}$).

In accordance with the present invention, a salt of an alkaline-earth metal, preferably calcium or strontium, but also possibly barium or magnesium, is dissolved in a suitable solvent such as water or an alcohol. The salt may be a nitrate, an acetate, an oxalate, a sulfate, a chloride. Most preferably the salt is a nitrate, acetate or oxalate.

The salt solution is then applied to the oxygen ion conducting material in an amount sufficient to produce a desired molar ratio of the dopant. This molar ratio can be anywhere between about 0.001 and about 0.1. Alternatively, the salt solution can be applied to a mixture of cation salts or oxide salts present in the desired stoichiometric ratio. In case of cation salts, the solvent used to dissolve the dopant should not be effective to also dissolve the cation salts. For example, if calcium nitrate were the dopant salt dissolved in water, appropriate cation salts to make CGO would be cerium carbonate and gadolinium carbonate which would not significantly dissolve in water. In case of cation oxides, a calcium nitrate solution could be added to a mixture of cerium dioxide and gadolinium oxide in the desired proportions.

The oxygen ion conducting materials and the cation salts should be in a powder form having a particle size of no greater than about 100 microns. It is believed that the smaller the particle, the better the results obtainable in accordance with the present invention. The solution and particles are then thoroughly mixed by such conventional mixing techniques as ball milling so that the solution uniformly covers the surface of the particles.

The oxygen ion conducting material with solution applied or the cation salts or oxides with solution applied is then heated to evaporate the solvent and then decompose the salt of the solvent or in addition, where applicable cation salts and oxides. In this regard, the "heating" can be ambient heating in case of the solvent removal and then added heating for decomposition purposes. The "heating" can be accomplished in one step. The resultant ionic conductor can be ground into a powder and then formed into the desired configuration of the electrolyte. Advantageously, the oxygen ion conducting material or cation salts or oxides thereof with dopant solution applied can be formed into a desired configuration, for instance, a tubular layer or flat plate, and then heated to evaporate the solvent, decompose the dopant salt, the electrolyte cation salt or the cation oxide. If necessary a suitable organic binder can be mixed with the oxygen ion conducting material or cation salts or oxides prior to the formation of the same. Thereafter, further heating can be applied to form a sintered ceramic layer or form of the ionic conductor in a desired shape.

A particularly preferred ionic conductor in accordance with the present invention is calcium-doped CGO. This can be formed by the addition of calcium nitrate to a doped cerium dioxide having a composition given by the formula $Ce_{1-x}M_xO_{2-d}$ where M is one or a mixture of Sm, Gd, Y, La, Pr, Sc, (most preferably Sm, Gd or Y) and x is between about 0.03 and about 0.5 and more preferably, between 0.08 and 0.25. The value of d is such that the composition is rendered charge neutral. A preferred oxygen ion conducting material has a composition given be the chemical formula $Ce_{0.9}Gd_{0.1}O_{2-d}$ (the value of d is such that the composition is rendered charge neutral).

Preferably, 1 cation percent calcium is added to a doped ceria oxygen ion conducting material. Additions of calcium of between about 0.01 cation percent and about 10 cation percent are encompassed within the present invention. A preferred range is between about 0.1 and about 5 cation percent and a particularly preferred range is between about 0.5 cation percent and about 2.5 cation percent. The foregoing is preferably accomplished with a solution of 0.05 molar concentration.

As mentioned above, after the solution is added to the oxygen ion conducting material, the solvent may be evaporated by ambient heat or by addition of external heat. Thereafter, the calcium nitrate can be decomposed by further heating to a temperature of about 650° C.

As also mentioned above, the solution-treated electrolyte substance or cation salts or oxides can be heated to sintering after having been formed into a desired shape or configuration. In this regard, the heating conditions can be at a temperature of between about 1250° C. and about 1700° C. that is maintained for between about 5 minutes and about 24 hours, depending upon the thickness and size of the configured ionic conductor. More optimal heating conditions are between about 1350° C. and about 1550° C. for between about 1 and about 10 hours. Heating conditions of between about 1400° C. and about 1500° C. are particularly preferred for most configurations of ionic conductors in accordance with the present invention that are applied to ceramic membrane elements within oxygen generators. In all of the foregoing ranges, temperatures are obtained and cool down is accomplished at heating or cooling rates of about 2° C./minute.

With reference to FIG. 1, several ionic conductors were tested to illustrate the application of the present invention to doped-CGO oxygen ion conducting materials having a high silicon content, that is between about 100 and 300 parts per million and a low silicon content, less then 50 parts per million. In all tests, testing samples were prepared by first pressing about 2.5 grams of powder into a die to produce a green test pellet form having a diameter of about 13 mm and a thickness of about 5 mm. The green test pellet form was then heated at 2° C. to 1400° C. and held for four hours and then cooled back to ambient temperature at 2° C. per minute to produce a sintered test pellet. The sintered test pellet was then tested for oxygen ion conductivity using an AC impedance spectroscope. Strength testing was accomplished by an electromechanical test apparatus in four point bend configuration according to ASTM Standard C1161.

In samples prepared in accordance with the present invention, the formation of calcium-doped CGO referred to in FIG. 1 as CGO5 is illustrative of the preparation in accordance with the present invention. In preparing this particular sample, a gadolinium doped cerium dioxide powder of composition $Ce_{0.9}Gd_{0.1}O_{2-d}$ (the value of d is such that the composition is rendered charge neutral) was obtained from Praxair Specialty Chemicals, Seattle, Wash., United States of America. The powder had a high silicon content of between about 100 parts per million and about 300 parts per million.

Calcium nitrate was dissolved in water to produce an aqueous solution of 0.05 molar concentration. It is to be noted that ethanol is another suitable, preferred solvent. The solution was added to the CGO powder in an amount such that the molar ratio of calcium cation content to total cation content (Ce+M+Ca) was 0.01 (1 cation % calcium).

The CGO powder with solution applied was then mixed using ball-milling to ensure homogenous distribution of the dissolved calcium salt throughout the suspension of doped cerium dioxide powder.

After ball-milling, the water was allowed to evaporate to leave a CGO powder that had a coating of the calcium salt homogeneously distributed over the surface of CGO particles. As may be appreciated, solvent removal could be enhanced by heating or possibly filtering. The treated powder was then loaded into the die and formed into the test pellet as described above.

The data points defined by reference CGO1 represent tests conducted on commercially available CGO ($Ce_{0.9}Gd_{0.1}O_{2-x}$) with a high conductivity and therefore, a low silicon content of less than about 50 parts per million.

The CGO2 sample is commercially available CGO ($Ce_{0.9}Gd_{0.1}O_{2-x}$) with a low conductivity produced by a high silicon content of between about 100 parts per million and about 300 part per million. As expected, it exhibits very low conductivity over the temperature range. When CGO2 is treated in accordance with the present invention by doping it with the use of a strontium nitrate solution in the amount of 1 cation percent, it becomes CGO3, a material having a conductivity that is essentially the same as CGO1.

Hence, a treatment in accordance with the present invention increases conductivity of high silicon content CGO to that obtainable in low silicon content CGO. Unexpectedly, a treatment in accordance with the present invention also increases the conductivity of doped CGO having a high silicon content over that obtainable by prior art techniques involving atomic mixing. In this regard, CGO6 is commercially available CGO having a low conductivity produced by a high silicon content of about 100 parts per million in which strontium is added by atomic mixing prior art techniques, such as combustion synthesis of a solution of dissolved metal salts, to produce $(Ce_{0.9}Gd_{0.1})_{0.995}Sr_{0.005}O_{2-x}$. It has a conductivity near that of sample CGO2. This is to be compared with sample CGO9 which was prepared by treating a sample identical to CGO2 in accordance with the present invention by the addition of 0.5 cation percent strontium added as strontium nitrate solution. Its conductivity over the temperature range is measurably in excess of CGO6.

Sample CGO4 was prepared by treating CGO2 with 0.5 cation percent calcium added in a calcium nitrate solution in accordance with the present invention. Its conductivity is not as great as CGO5 which is CGO2 with 1 cation percent calcium added as calcium nitrate solution.

Sample CGO7 was prepared by treating CGO2 with a transition metal, namely cobalt, at a level of 2 cation percent added as cobalt nitrate solution and CGO8 is CGO2 treated in accordance with the present invention with 1 cation percent cobalt added as cobalt nitrate solution and 1 cation percent calcium added as a nitrate solution. As is apparent the presence of the alkaline-earth metal demonstrably increases conductivity over the temperature range as compared with the use of a transition metal dopant alone and in greater quantities.

Figure 2:
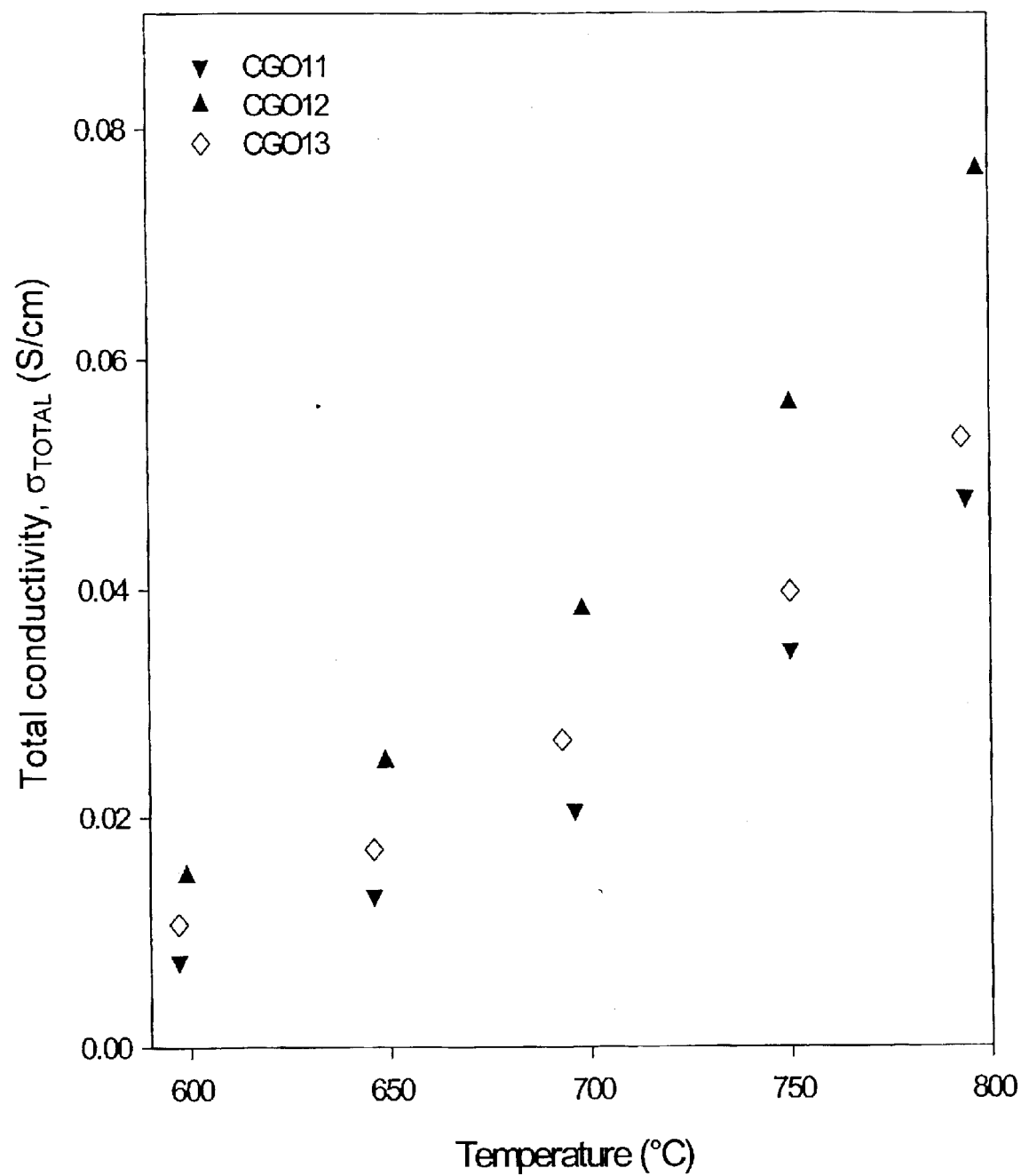
FIG. 2 is a graph of conductivity versus temperature of doped oxide ionic conductors manufactured in accordance with an alternative embodiment of the present invention compared with those of the prior art.

FIG. 2 displays the advantages of treating cation oxides used in forming CGO in accordance with the present invention to produce CGO doped with an alkaline-earth metal where such cation oxides contain silicon impurities at a level of about 100 parts per million. Sample CGO11 is a sintered mixture of commercially available cerium dioxide and gadolinium oxide powders to yield CGO having an average composition given by the chemical formula $Ce_{0.9}Gd_{0.1}O_{2-x}$. It has a high silicon content of between about 100 and about 300 parts per million. As expected, the resultant ionic conductor has the lowest conductivities over the temperature range. Sample CGO12 is a sintered mixture of commercially available cerium dioxide and gadolinium oxide powders used in the preparation of CGO11 treated in accordance with the present invention with 1 cation percent calcium added as calcium nitrate solution. This produced a calcium doped CGO having an average composition given by the chemical formula: $(Ce_{0.9}Gd_{0.1})_{0.99}Ca_{0.01}O_{2-x}$. As illustrated, the treated sample has the highest conductivities over the temperature range. This is to be compared with CGO13 which is a sintered mixture of commercially available cerium dioxide, gadolinium oxide used in the preparation of CGO11 and strontium carbonate. This yielded a strontium doped CGO having an average composition given by the chemical formula: $(Ce_{0.9}Gd_{0.1})_{0.99}Sr_{0.01}O_{2-x}$. The CGO11 sample has lower conductivities over the temperature range than CGO12 which is unexpected given the fact that the 1 percent strontium and calcium-doped CGO in which CGO powder was treated in accordance with the present invention (CGO3 and CGO5) had similar conductivities. Thus, the treatment in accordance with the present invention increases the conductivity over that which could be expected by the addition of an alkaline-earth metal alone.

The forgoing samples were examined with the use of an energy dispersive X-ray analysis in a scanning electron microscope. Within the accuracy of measurement it was found that there were no uneven distributions of dopants apart from the interactions found between calcium and strontium species and silicon at the grain boundaries which was expected given the presumptive operative mechanisms of the present invention. As such, the results for CGO11 of FIG. 2 would be similar for an atomic mixing preparation of such sample that has been disclosed in Ralph et al., discussed above. Moreover, when sample CGO5, that utilized a more contaminated CGO than Ralph et al. was compared with the graphically depicted results of this reference, it was also found that CGO5 had conductivites slightly above those of Ralph et al.

Figure 3:
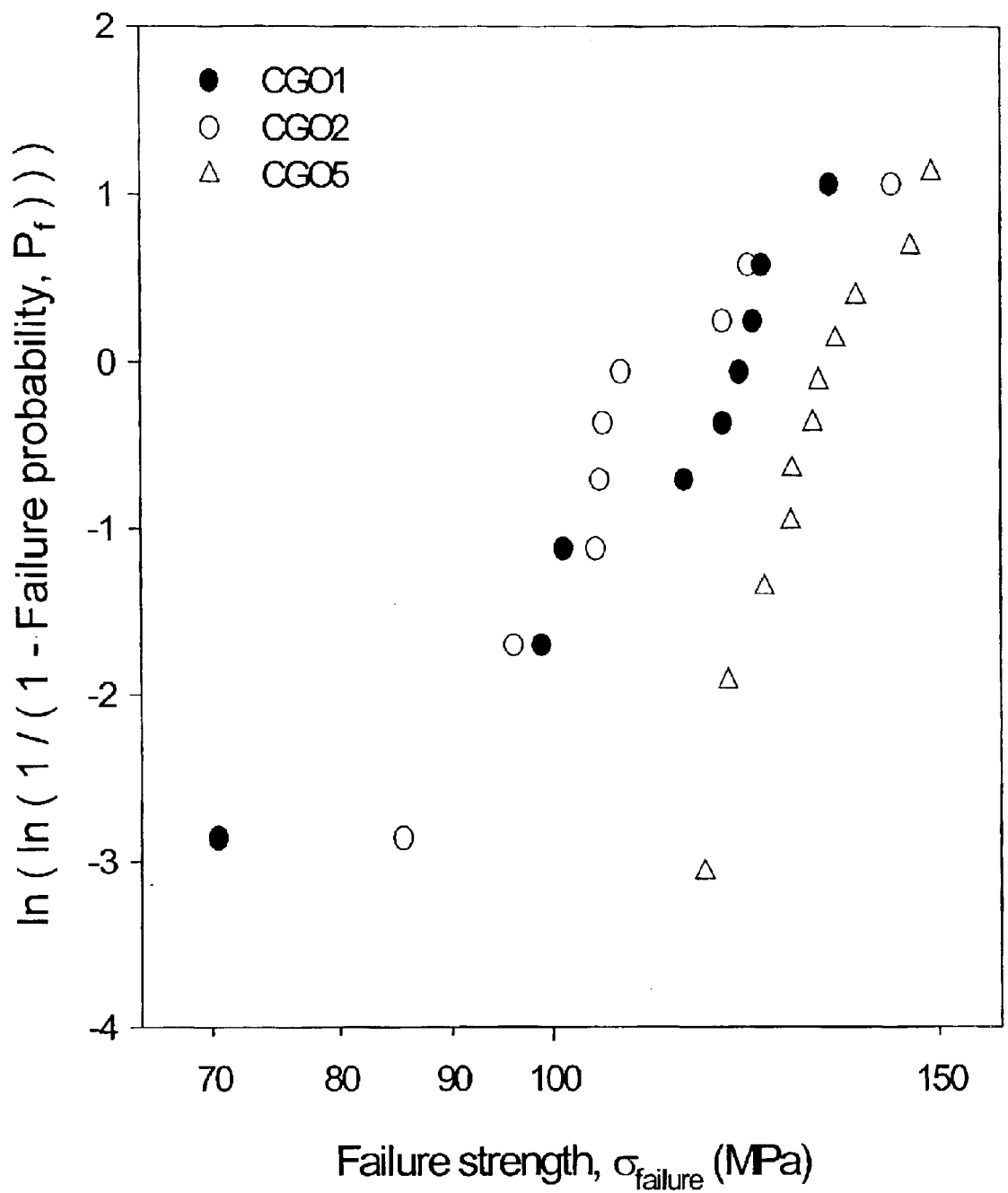
FIG. 3 is a graph of failure probability versus failure strength of doped oxide ionic conductors of the present invention compared with those of the prior art.

With reference to FIG. 3, it can be seen that production in accordance with the present invention as evidenced by CGO5 increases the ultimate failure strength of the ionic conductor as compared with CGO1 (the high conductivity CGO) and CGO2 (the low conductivity CGO.) Hence, it can be said that the present invention not only raises the conductivity of high silicon containing ionic conductors but also has the added advantage of increasing their strength.

While the present invention has been described with reference to preferred embodiment, as will occur to those skilled in the art, numerous changes, additions and omissions can be made without departing from the spirit and scope of the present invention.

I claim:

1. A method of manufacturing an ionic conductor to improve oxygen ion conductivity that is otherwise reduced by the presence of deleterious impurities comprising silicon, said method comprising:

dissolving a salt of a dopant into solvent to form a solution, the dopant consisting of an alkaline-earth metal;

applying the solution to an oxygen ion conducting material composed of doped ceria, doped zirconia, or doped lanthanum gallate and having said deleterious impurities, the oxygen ion conducting material being in a powder having particles of less than about 100 microns in size;

the solution being applied such that a molar ratio of the dopant to total cations within said ionic conductor is between about 0.001 and about 0.1;

mixing the solution and the particles so that the solution uniformly covers the particles; and heating the oxygen ion conducting material with the solution applied thereto to evaporate the solvent and to decompose the salt and thereby to form said ionic conductor.

2. A method of manufacturing an ionic conductor to improve oxygen ion conductivity that is otherwise reduced by the presence of deleterious impurities comprising silicon, said method comprising:

dissolving a salt of a dopant into solvent to form a solution, the dopant consisting of an alkaline-earth metal;

applying the solution to a mixture of precursor salts that are substantially insoluble in said solvent or oxides of the constituent cations of an oxygen ion conducting material composed of doped ceria, doped zirconia, or doped lanthanum gallate and having the deleterious impurities, the precursor salts or oxides being in powder form having particles of less than about 100 microns in size;

the solution being applied such that a molar ratio of the dopant to total cations within said ionic conductor is between about 0.001 and about 0.1;

mixing the solution and the particles so that the solution uniformly covers the particles; and heating the precursor salts or oxides with the solution applied thereto to evaporate the solvent and to decompose the salts or oxides and thereby to form said ionic conductor.

3. The method of claim 1 or claim 2, wherein said oxygen ion conducting material is doped cerium dioxide having a general chemical formula of $Ce_{1-x}M_xO_{2-d}$, wherein M is Sm, Gd, Y, La, Pr, Sc or mixtures thereof, x is between about 0.03 and 0.5, and the value of d is such that the composition is rendered charge neutral.

4. The method of claim 3, wherein the molar ratio is between about 0.001 and about 0.05.

5. The method of claim 3, wherein the molar ratio is between about 0.005 and about 0.025.

6. The method of claim 3, wherein x is between about 0.08 and about 0.25.

7. The method of claim 1 or claim 2, wherein:

the dopant is calcium; and said oxygen ion conducting material is doped cerium dioxide having a general chemical formula of $Ce_{1-x}Gd_xO_{2-d}$, wherein x is between about 0.03 and 0.5, and the value of d is such that the composition is rendered charge neutral.

8. The method of claim 7, wherein x is between about 0.08 and about 0.25.

9. The method of claim 8, wherein the molar ratio is between about 0.005 and about 0.025.

10. The method of claim 9, wherein x is 0.1 and the molar radio is 0.01.

11. The method of claim 1 or claim 2, wherein the solution is about 0.05 molar concentration.

12. The method of claim 1, further comprising forming said oxygen ion conducting material with solution applied into a desired configuration before heating the same and then heating said oxygen ion conducting material under conditions sufficient to sinter the ionic conductor.

13. The method of claim 2, further comprising forming said mixture with said solution applied into a desired configuration before heating the same and then heating said mixture with said solution applied under conditions sufficient to sinter the ionic conductor.

14. The method of claim 1 or claim 2, wherein said dopant is calcium or strontium.

* * * * *

UNITED STATES PATENT AND TRADEMARK OFFICE
CERTIFICATE OF CORRECTION

PATENT NO. : 6,838,119 B2
DATED : January 4, 2005
INVENTOR(S) : Lane

It is certified that error appears in the above-identified patent and that said Letters Patent is hereby corrected as shown below:

Column 1,
Line 5, please place the following before "FIELD OF THE INVENTION":

-- STATEMENT REGARDING FEDERALLY SPONSORED RESEARCH OR DEVELOPMENT

This invention was made with the United States government support under NIST ATP Award No. 70NANB0H3052 awarded by the National Institute of Standards and Technology (NIST). The United States government has certain rights in the invention. --

Signed and Sealed this

Nineteenth Day of April, 2005

JON W. DUDAS
*Director of the United States Patent and Trademark Office*